US006525314B1

(12) United States Patent
Jarrell et al.

(10) Patent No.: US 6,525,314 B1
(45) Date of Patent: Feb. 25, 2003

(54) COMPACT HIGH-PERFORMANCE MASS SPECTROMETER

(75) Inventors: Joseph A. Jarrell, Newton Highlands, MA (US); Guo-Zhong Li, Westborough, MA (US)

(73) Assignee: Waters Investments Limited

( * ) Notice: Subject to any disclaimer, the term of this patent is extended or adjusted under 35 U.S.C. 154(b) by 0 days.

(21) Appl. No.: 09/396,226

(22) Filed: Sep. 15, 1999

(51) Int. Cl.[7] .......................... B01D 59/44; H01J 49/00
(52) U.S. Cl. ....................................... 250/297; 250/292
(58) Field of Search ................................ 250/281, 282, 250/292, 287, 396 R

(56) References Cited

U.S. PATENT DOCUMENTS 4,329,582 A * 5/1982 French et al. ............... 250/292
4,952,803 A * 8/1990 Matsuda ..................... 250/296
5,464,985 A * 11/1995 Cornish et al. ............. 250/287
5,654,545 A * 8/1997 Holle et al. ................. 250/282
6,177,668 B1 * 1/2001 Hager ........................ 250/282

* cited by examiner

*Primary Examiner*—Bruce Anderson
(74) *Attorney, Agent, or Firm*—Anthony J. Janiuk

(57) ABSTRACT

A compact high-performance mass spectrometer includes an ion source, an ion filter, a collision cell, a fragment filter, and an ion detector, along with one or more ion deflectors and one or more gas removal rings. An ion deflector allows a straight ion filter and a straight collision cell to be coupled in a folded configuration to make a compact design without the loss of performance associated with the use of curved quadrupole components. A gas removal ring, located proximate to an ion path aperture of the collision cell, allows an ion path aperture to be large for high sensitivity while minimizing performance degradation associated with the tendency of collision cell gas to escape via the collision cell ion path apertures to enter the high vacuum region and the detector.

20 Claims, 15 Drawing Sheets

COMPACT HIGH-PERFORMANCE MASS SPECTROMETER

FIELD OF THE INVENTION

The present invention relates to mass spectrometers that use electrodynamic assemblies as mass filters, and in particular to tandem mass spectrometers that use multiple quadrupole mass filters.

BACKGROUND OF THE INVENTION

A traditional tandem mass spectrometer that uses multiple quadrupole mass filters comprises an ion source, a first mass analyzer, a collision cell, a second mass analyzer, and ion detector, typically laid out in a straight line. Since the quadrupole mass filters are generally 0.2 to 2 cm in diameter and 5 to 30 cm long, this straight line arrangement tends to produce an elongated mass spectrometer of one or more meters in length.

Mass spectrometry is an analytical technique for determining the composition of compounds present in a sample. In a single stage mass spectrometer using a quadrupole mass filter, compounds in a sample are ionized, accelerated and focused to form a stream or beam of ions that enters a first quadrupole mass filter. Appropriate adjustment of the alternating and constant voltages applied to the first or only quadrupole mass filter allows the user to select which ionic species are transmitted through the filter. Ions emerging from the filter are detected and converted to electrical impulses or current by known means such as an electron multiplier. Rapid scanning of these voltages further allows the user to produce a spectrum of the ionic species corresponding to the sample compounds.

For some purposes, it is useful to select a first ionic species in a first filter, fragment the ions of the first ionic species to produce ionized fragments, and then analyze the ionized fragments with a second quadrupole mass filter. The ionized fragments are typically detected by known means such as an electron multiplier. For example, analyzing these fragments can aid in elucidating the structure of an unknown molecule. One method of producing such fragments is through a technique of accelerating the selected ion to an energy between 2–100 eV and inducing collisions between sample ions and inert molecules in a collision cell.

Collision cells are well known in the art. A typical collision cell comprises a housing at an elevated pressure ($10^{-4}$ to $10^{-2}$ Torr of Argon or Xenon) containing a set of parallel rods to which alternating electric potentials are applied. These potentials serve only to help contain and focus the sample and fragment ions. Sample ions enter at one end of the collision cell and fragment ions, and any remaining sample ions, emerge from the other.

Mass filters and collision cells typically employ electrodynamic assemblies to impose alternating electric fields on ions and fragments. These electrodynamic assemblies typically comprise an even number of electrodes arranged about a central axis. Ions travel about the axis where the ions and/or fragments are subjected to electric fields. Electrodynamic assemblies which employ four electrodes are known in the art as quadrupoles. Although cylindrical electrodes are common, the electrodes may assume a variety of shapes. Quadrupole assemblies are generally described by Paul et al. in U.S. Pat. No. 2,939,952.

In a quadrupole mass filter and in a collision cell, each electrode is typically 0.2 to 2.0 cm in diameter and 5 to 30 cm long. One common configuration of a quadrupole mass filter based mass spectrometer employs three quadrupole assemblies, each arranged in line about a common central axis to allow ions to travel a substantially straight path. The arrangement, simple in execution, requires a substantial amount of linear space. A linear space of one or more meters in length is frequently required.

An example of a prior art tandem mass spectrometer is the PE-Sciex model API 300, manufactured by PE-Sciex, Thornhill, Ontario, Canada. FIGS. 15A and 15B provide a schematic view and a cut away elevation view, respectively, of this instrument. The ion path elements of the API 300 mass spectrometer are laid out in a straight line. As illustrated in FIG. 15A, the ion path elements of the model API 300 include an ion source 101, an ion filter 102, a collision cell 103, a fragment filter 104 and an ion detector 105. The carriage assembly which supports most of the ion optics components is illustrated in FIG. 15B. The carriage assembly is enclosed in a high vacuum chamber (not shown). A detailed description of a tandem mass spectrometer of this type is provided in U.S. Pat. No. 4,234,791, issued Nov. 18, 1980, to Enke et al.

It is desirable to make mass spectrometers that are more compact and that have higher performance. Many prior art mass spectrometers are elongated and occupy too much space on a typical laboratory bench. Some attempts to design a compact mass spectrometer have been made. Bear Instruments, Inc., of Santa Clara, Calif. used a curved first quadrupole filter (analyzer), a curved collision cell, and a curved second quadrupole filter (analyzer). A tandem mass spectrometer using this approach is disclosed in U.S. Pat. No. 5,559,327 to Steiner. The instrument was marketed by Bear Instruments, Inc. as "Bear Cub 800". However, the introduction of curvature into a quadrupole filter was found to adversely affect stability of the quadrupole filter, thereby limiting the resolution of the mass spectrometer. Subsequently, Bear Instruments introduced the "Kodiak 1200 Quadrupole Mass Spectrometer". This instrument uses straight filters in conjunction with a curved collision cell. The curved collision cell turns the ion beam through an angle of 180°. Although the curvature of a collision cell has less adverse effect on performance than curvature of a quadrupole filter the effect on the performance of the instrument and the costs of manufacture and alignment are not negligible. Accordingly, there is still a need for a compact high-performance mass spectrometer.

SUMMARY OF INVENTION

The present invention provides a compact high-performance mass spectrometer. To achieve a compact design with high performance, a preferred embodiment includes an ion deflector and a gas removal ring. The ion deflector allows a straight ion filter and a straight collision cell to be coupled in a folded configuration to make a compact design without the loss of performance associated with the use of curved quadrupole components. The gas removal ring, located proximate to an ion path aperture of the collision cell, allows an ion path aperture to be large for high sensitivity while minimizing performance degradation associated with the tendency of collision cell gas to escape via the collision cell ion path apertures to enter the high vacuum region and the detector.

As used herein, "compact" refers to occupying a small area of laboratory bench with emphasis on the mass spectrometer's, longest dimension. The longest dimension of a mass spectrometer is usually the sum of the lengths of the aligned components in the ion path trajectory. The longest components are typically the quadrupole components, i.e., the two ion filters and the collision cell. As used herein, "performance" refers to a combination of sensitivity and resolution.

The preferred embodiment of the mass spectrometer of the present invention includes an ion source, an ion filter, an ion deflector, a collision cell having a gas removal ring at each of its ends, a fragment deflector, a fragment filter and an ion detector. The collision cell includes a gas enclosure having an ion entry aperture and a fragment exit aperture. The ion source produces a stream of ions, each ion having a mass to charge ratio in accordance with its structure. The ion filter accepts ions from the ion source and selectively passes ions according to mass to charge ratio. Ions leaving the ion filter enter an ion deflector which deflects them through a first angle into the collision cell. In the collision cell, ions are fragmented to produce fragments. Fragments leaving the collision cell enter the fragment deflector which deflects them through a second angle into the fragment filter. The fragment filter selectively passes fragments according to mass to charge ratio. Fragments leaving the fragment filter enter the ion detector.

The preferred embodiment further includes an enclosure assembly defining an ion-path chamber, an ion source chamber and a components chamber. A first vacuum pump, having a high vacuum flange and a low vacuum flange, is mounted within the components chamber. The high vacuum flange is coupled to the ion-path chamber. The low vacuum flange is coupled to the ion-source chamber.

The preferred embodiment further includes a second vacuum pump, having a high vacuum flange and a low vacuum flange. The second vacuum pump is mounted within the components chamber. The high vacuum flange is coupled to the ion-path chamber. The low vacuum flange is coupled to the gas removal ring.

In the preferred embodiment the ion deflector and the fragment deflector each include an ion lens and an ion mirror, the ion lens located on the ion trajectory proximate to the ion mirror.

In the preferred embodiment the first angle and the second angle are both approximately 90°.

In alternative embodiments, either the ion deflector or the fragment deflector or both may include an energy analyzer tuned to effect a change in ion trajectory. In alternative embodiments, the first angle may be one angle and the second angle may be the same as the first angle, or a different angle. Either angle may be approximately 90° or approximately 180° or any angle between 90° and 180°. Less advantageously, either angle may be between 0° and 90°.

Another alternative embodiment of the mass spectrometer of the present invention includes an ion source, an ion filter, a first gas removal ring, a collision cell, a second gas removal ring, a fragment filter and an ion detector. The collision cell has a gas enclosure with an ion entry aperture and a fragment exit aperture. The first gas removal ring is proximate to the ion entry aperture. The second gas removal ring is proximate to the fragment exit aperture. Each gas removal ring is positioned to remove gas from a portion of ion trajectory proximate to an aperture of the collision cell.

DETAILED DESCRIPTION

Figure 1:
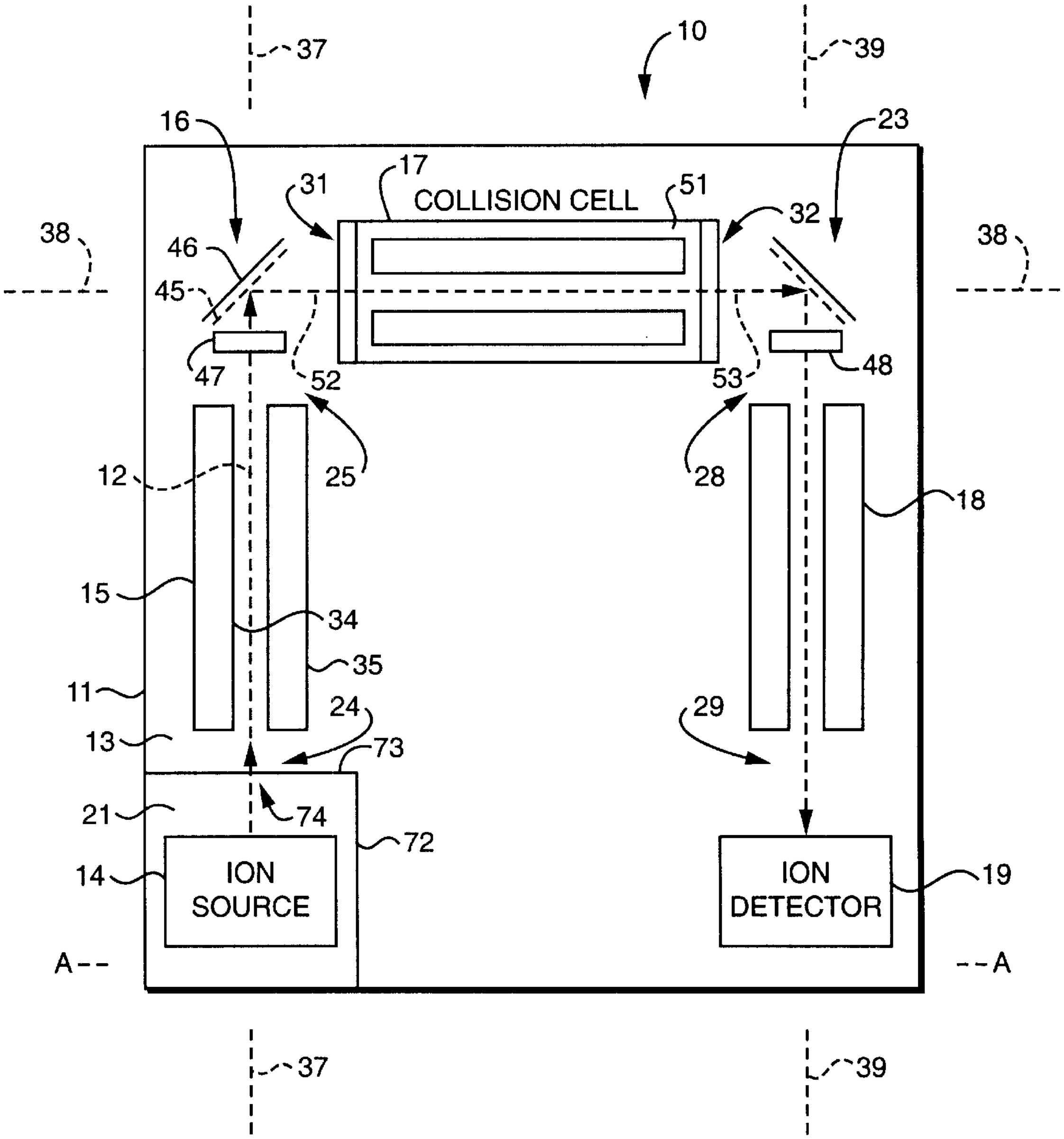
FIG. 1 is a schematic representation of the preferred embodiment of a mass spectrometer according to the present invention.

FIG. 1 shows a preferred embodiment of a mass spectrometer according to the present invention. In particular, it shows the arrangement of ion path components within the housing. For purposes of clarity, details of the supporting structure, the vacuum enclosure, vacuum components and electronic components are not shown.

Referring to FIG. 1, tandem mass spectrometer 10 is housed in an enclosure assembly 11. Ion path components include ion source 14, ion filter 15, ion lens 47, ion deflector 16, collision cell 17 (with its first integral gas removal ring 31 and second integral gas removal ring 32), fragment deflector 23, ion lens 48, fragment filter 18, and ion detector 19. Note that all components except the ion source are in the high vacuum ion path chamber 13, at approximately $4\times10^{-5}$ Torr. The low vacuum ion source chamber 21 is at approximately $8\times10^{-3}$ Torr.

Trajectory 12 is shown dotted, starting at ion source 14 and ending at ion detector 19. The preferred trajectory passes along ion filter axis 37, cell axis 38 and fragment filter axis 39. Ions leaving ion source 14 enter ion filter 15 at ion filter entry end 24 and exit ion filter 15 at ion filter exit end 25 to pass through ion lens 47. Ions deflected by ion deflector 16, enter collision cell 17 (with its first integral gas removal ring 31 and second integral gas removal ring 32) at ion entry aperture 52. In the collision cell large ions are induced to collide to form smaller ions referred to as fragments. These fragments exit collision cell 17 at second integral gas removal ring 32, fragment exit aperture 53 before being deflected by fragment deflector 23. Deflected fragments then pass through ion lens 48 and enter fragment filter 18 at fragment filter entry end 28. Filtered fragments leave at fragment filter exit end 29 to be captured and detected by ion detector 19.

Ion filter 15 is a quadrupole filter having four quadrupole rods. Two of these rods, quadrupole rods 34 and 35, are shown in FIG. 1. Fragment filter 18 is also a quadrupole filter having four quadrupole rods, as is collision cell 17. Although collision cell 17 is in the high vacuum of ion path chamber 13, the collision cell includes gas enclosure 51 which contains a gas suitable for collision-induced dissociation (e.g. a gas such as xenon or argon) at a pressure of approximately $1\times10^{-2}$ Torr. If this gas were to escape in significant quantities via ion entry aperture 52 and fragment exit aperture 53, shooting out in both directions along the line of the ion trajectory, it would have an adverse effect on resolution and/or sensitivity. An advantage of the ion and fragment deflectors, as used in the present invention, is that the gas does not shoot directly into ion filter 15, or directly into fragment filter 18. Also, the adverse affect of escaping gas is further reduced by first gas removal ring 31 (shown in FIG. 1 and FIG. 8E) and second integral gas removal ring 32 (shown in FIG. 1 only). The use of a gas removal ring permits the use of a larger aperture which provides increased sensitivity.

Figure 2:
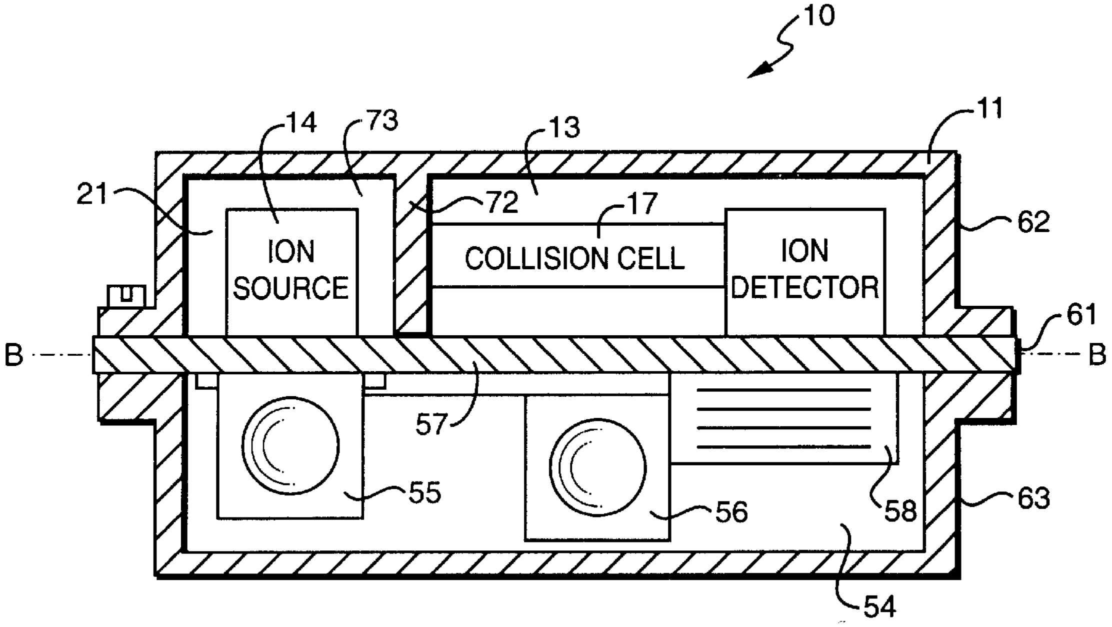
FIG. 2 is a cross section elevation view of the embodiment of FIG. 1 across A—A.

FIG. 2 is a cross section elevation view of the preferred embodiment of tandem mass spectrometer 10, across A—A, in FIG. 1. FIG. 2 shows details of the supporting structure, the vacuum enclosure, the vacuum pumps and the vacuum delivery manifold of the preferred embodiment. Enclosure assembly 11 includes baseplate 61, top cover 62 and bottom cover 63. Baseplate 61 and top cover 62 define the high vacuum ion path chamber 13 and the low vacuum ion source chamber 21. Ion source chamber 21 is further defined by first wall 72 and second wall 73. Ion path components that can be seen in the ion path chamber, as shown in FIG. 2, are ion source 14, collision cell 17 and ion detector 19. Components chamber 54 contains first split-flow vacuum pump 55, and second split-flow vacuum pump 56. The first split-flow vacuum pump 55 and the second split-flow vacuum pump 56 are preferably turbomolecular drag pumps. Components chamber 54 also contains vacuum delivery manifold 57 and an electronics unit 58. Delivery manifold 57 is coupled to the two gas removal rings in the assembled mass spectrometer. Preferably, top cover 62 and bottom cover 63 are castings. Suitable split-flow vacuum pumps, such as Pfeiffer turbomolecular drag pump model TMH 261-150-005, are available from Pfeiffer Vacuum Technology, Inc., Nashua, N.H.

Rigid baseplate 61 defines the orientation and alignment of all ion path components by means of a set of precision pins, holes and stops. The pins, holes and stops (not shown) are used to precisely locate the ion optics elements, including the deflectors, one to another so as to achieve a desired trajectory.

Figure 3:
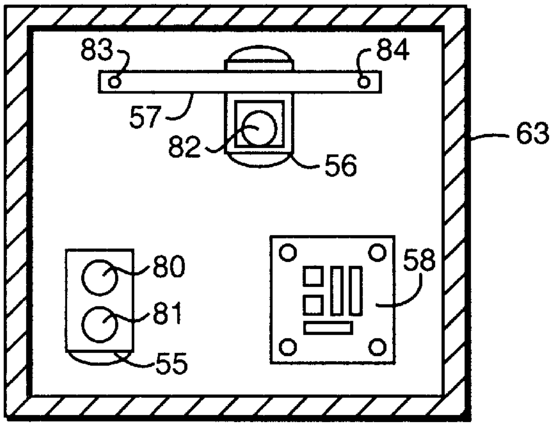
FIG. 3 is a cross section plan view of the embodiment of FIG. 1 across B—B.

FIG. 3 is a cross section plan view of the components chamber of the preferred embodiment. It is a cross section view across B—B in FIG. 2 looking down. FIG. 3 shows the location of first split-flow vacuum pump 55, second split-flow vacuum pump 56 and vacuum delivery manifold 57. Each of split-flow vacuum pumps 55 and 56 has a high vacuum coupler and a low vacuum coupler. First high vacuum coupler 80 and first low vacuum coupler 81 of first split-flow vacuum pump 55 are coupled respectively to the high vacuum ion path chamber 13 and to the comparatively low vacuum of ion source chamber 21 (chambers 13 and 21 are both shown in FIG. 2). Second high vacuum coupler 82 is also coupled to the high vacuum ion path chamber 13 to augment the pumping of first split-flow vacuum pump 55. Vacuum delivery manifold 57, via low vacuum coupler 83 and low vacuum coupler 84, pumps escaping gas from ion entry aperture 52 and fragment exit aperture 53, respectively.

Figure 4:
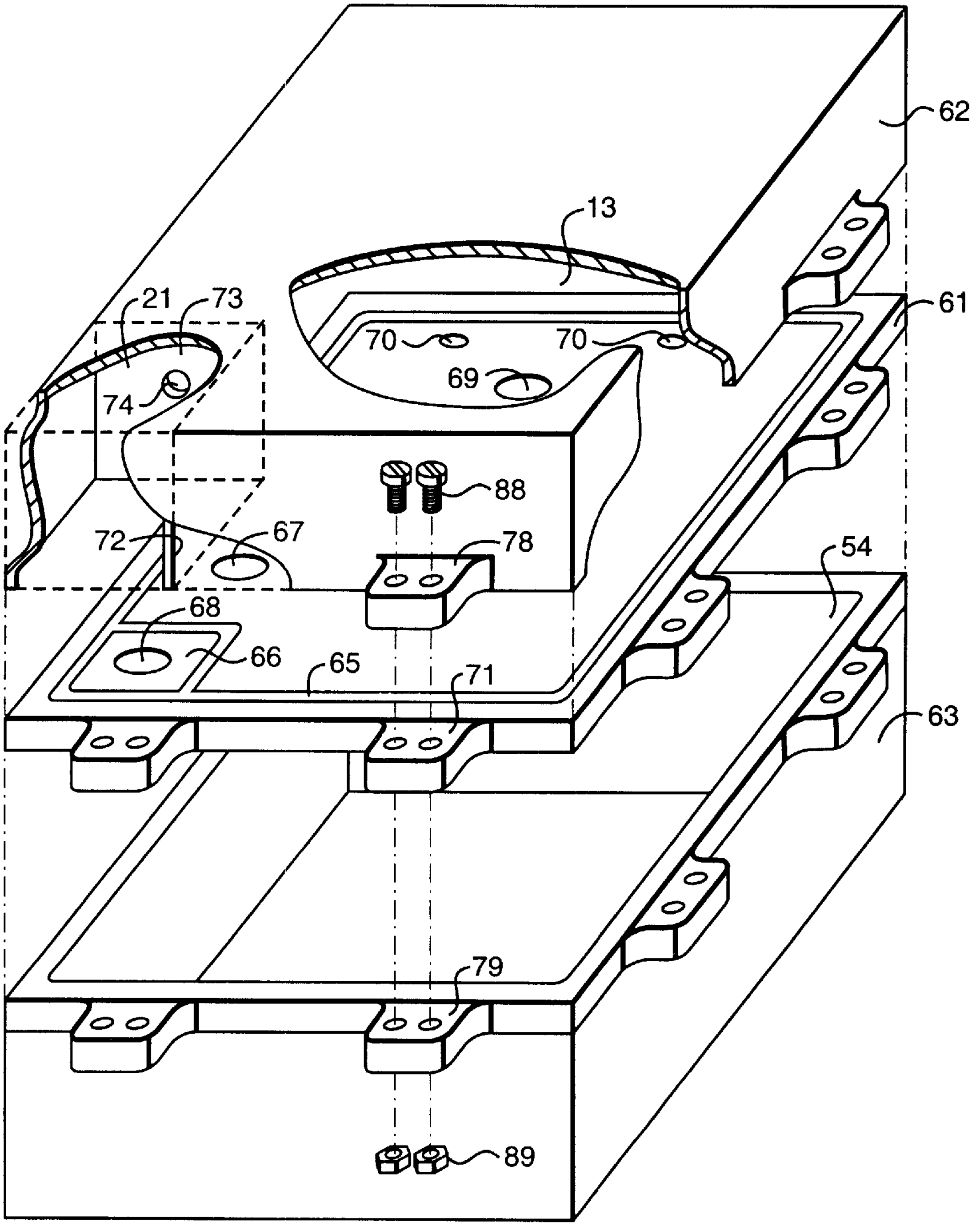
FIG. 4 is a partially cut away perspective view of the embodiment of FIG. 1.

The mechanical structure of the housing of the preferred embodiment is shown in the partially cut away perspective view of FIG. 4. It can be seen from FIG. 4 that baseplate 61 and top cover 62 define vacuum chamber 13. Ion source chamber 21 is defined by baseplate 61, top cover 62, first wall 72, and second wall 73. It can also be seen that baseplate 61, bottom cover 63 define components chamber 54. Note ion exit aperture 74 in second wall 73. Baseplate 61 has a groove shaped to accept vacuum gasket 65 and its ion source enclosure portion 66. This gasket, in contact with the lower surface of top cover 62, helps to maintain the high vacuum in ion path chamber 13 and the low vacuum in ion source chamber 21. The gasket is held under mechanical pressure by nuts 89 on bolts 88, the bolts passing through clamping bosses such as 71, 78 and 79. First high vacuum aperture 67 and first low vacuum aperture 68 are vacuum couplers coupling the high vacuum (from first high vacuum coupler 80) and the low vacuum (from first low vacuum coupler 81) of first split-flow vacuum pump 55 (shown in FIG. 3) to ion path chamber 13 and ion source chamber 21, respectively. Three holes in baseplate 61 of FIG. 4 are vacuum pass-through holes. The three holes are high vacuum pass-through hole 69 (associated with the ion path chamber) and the two low vacuum pass-through holes 70. High vacuum pass-through hole 69 passes high vacuum from second high vacuum coupler 82 to exhaust ion path chamber 13. Holes 70 pass low vacuum from a second low vacuum coupler ( not shown) of second split-flow vacuum pump 56 via vacuum delivery manifold 57 to exhaust the two integral gas removal rings 31 and 32 of FIG. 1.

Figure 5:
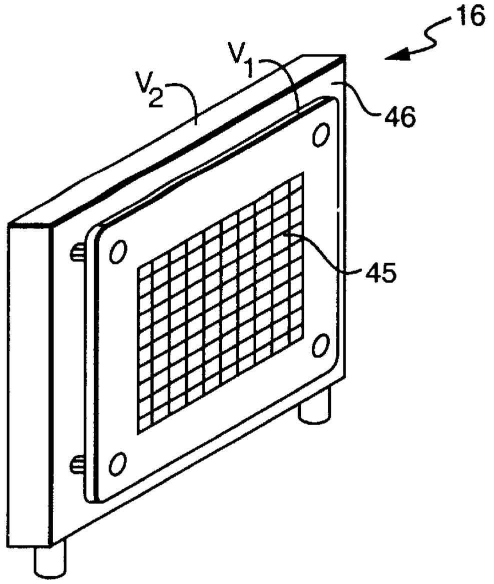
FIG. 5. is a perspective view of the ion deflector of the embodiment of FIG. 1.
Figure 6:
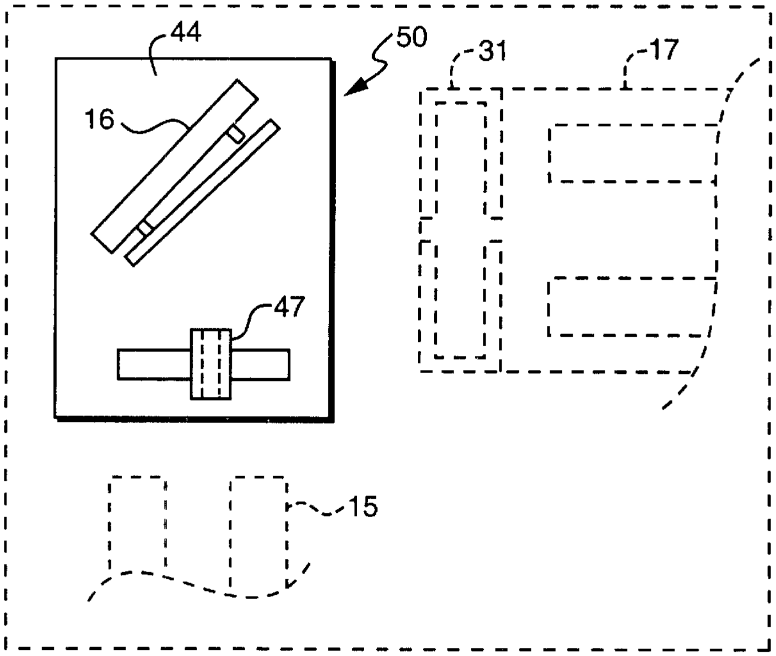
FIG. 6. is a plan view of the ion deflector assembly of the embodiment of FIG. 1.

Ion deflector 16 of the preferred embodiment is shown in detail in FIG. 5. The deflector includes a grid 45 and a stainless steel repeller plate 46, the grid mounted to the plate by insulating standoffs. In use the grid and the plate are maintained at different electrical potentials, $V_1$ and $V_2$, respectively. In the preferred embodiment $V_1=0$ volts, i.e. the grid is grounded. $V_2$ must be greater than the incident ion energy measured in electron volts for singly charged ions. In the preferred embodiment, with incident ion energy in the range 1–5 eV, $V_2$ is set to 10 volts. The grid is preferably #MN-20 nickel mesh 90.1 lpi 90.3% transmission, available from Buckbee-Mears, Inc. of St. Paul, Minn. FIG. 6 is a plan view of ion deflector assembly 50. FIG. 6 shows ion deflector 16 and ion lens 47 both mounted to ion deflector base 44. The grid and the plate are typically separated by a distance of approximately 3 mm.

Figure 7:
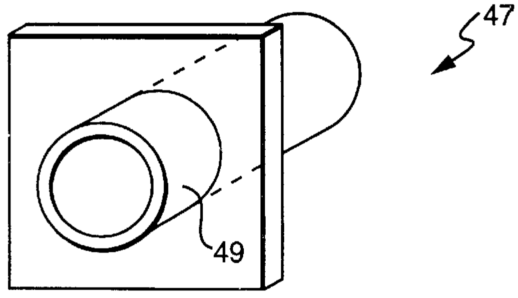
FIG. 7 is a perspective view of the ion lens of the embodiment of FIG. 1.

FIG. 7 is a perspective view of ion lens 47, the main component of which is electrically conducting tube 49. Preferably, tube 49 is made of stainless steel.

Figure 8A:
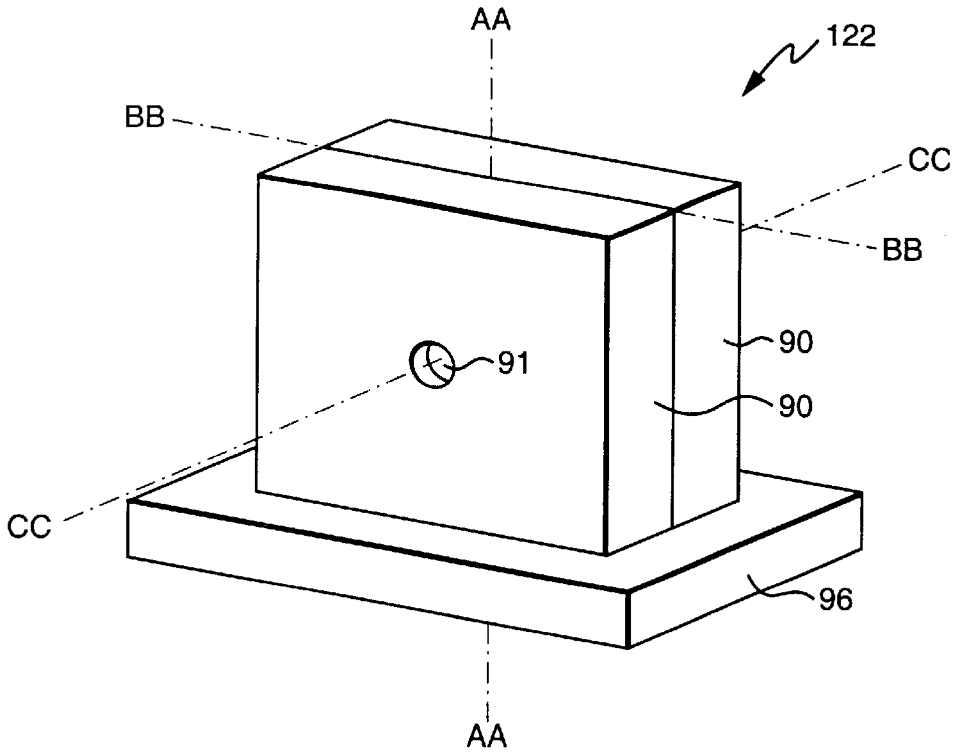
FIG. 8A is a perspective view of a stand-alone gas removal ring.
Figure 8B:
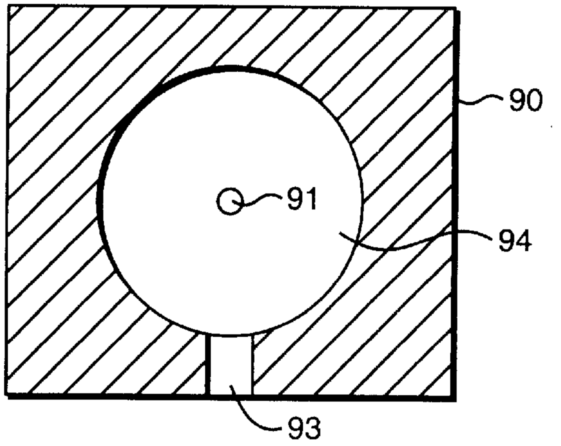
FIG. 8B is a cross section front elevation view, across AA—AA and BB—BB in FIG. 8A, of the gas removal ring.
Figure 8C:
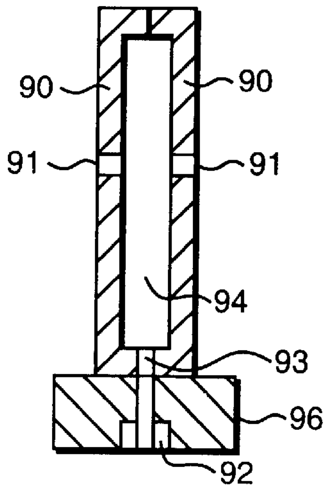
FIG. 8C is a cross section side elevation view, across AA—AA and CC—CC in FIG. 8A, of the gas removal ring.
Figure 8E:
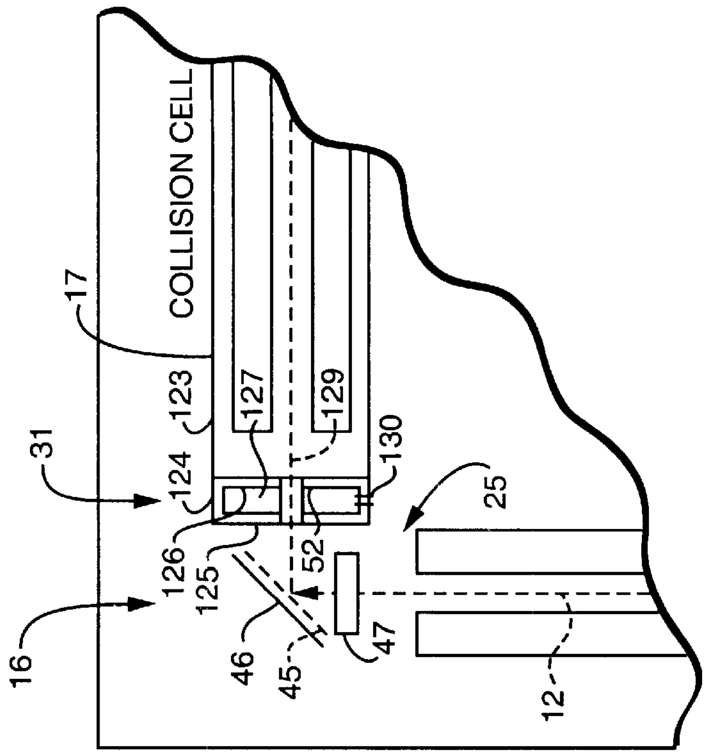
FIG. 8E is a schematic representation showing a portion of the mass spectrometer of the embodiment of FIG. 1, illustrating the integral gas removal rings of the collision cell.
Figure 8D:
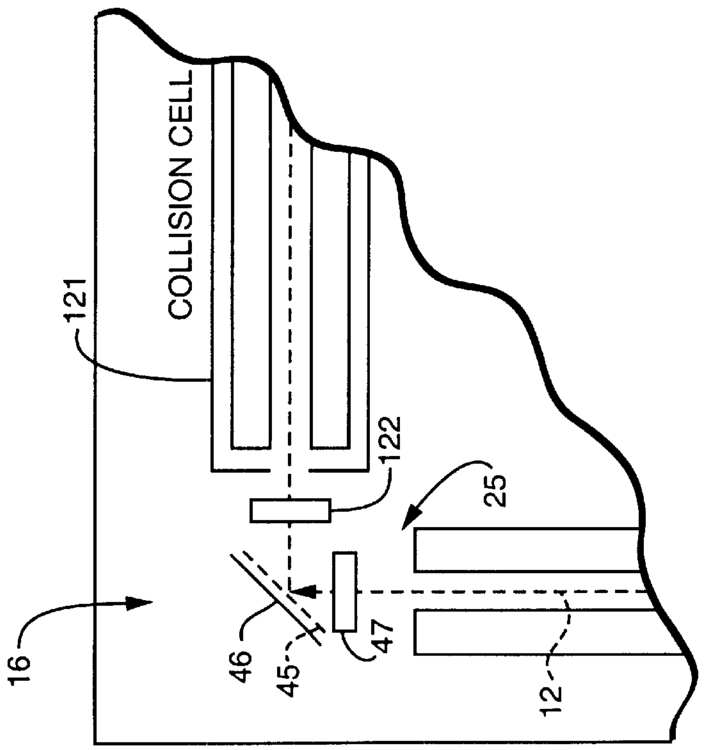
FIG. 8D is a schematic representation of a portion of an alternative embodiment that includes the stand-alone gas removal rings of FIG. 8A.

FIG. 8A is a perspective view of an embodiment of a stand-alone gas removal ring 122. FIG. 8B is a cross section front elevation view of the gas removal ring, viewed across AA—AA and BB—BB of FIG. 8A. FIG. 8C is a cross section side elevation view of the gas removal ring viewed across AA—AA and CC—CC of FIG. 8A. The gas removal ring is formed of two half-rings 90, each having a central circular ion-pass-thru hole 91. A cylindrical distribution cavity 94, coaxial with the two ion-pass-thru holes 91, is formed by cylindrical cavities in the inner face of each of the two half-rings 90. Distribution cavity 94 (shown in FIG. 8C) forms a pumping passageway to gas exhaust hole 93 and gas exhaust coupler 92 for gas molecules entering an ion-pass-thru hole 91 from the collision cell. For precise mounting of the gas removal ring to baseplate 61 (shown in FIG. 4), half-rings 90 are mounted to a common base 96. FIG. 8D is a schematic representation of a portion of an alternative embodiment that includes the stand-alone gas removal rings 122 of FIG. 8A.

In the preferred embodiment of FIG. 1, the collision cell includes an integral gas removal ring at each end. This principle is illustrated in FIG. 8E which shows the ion entry end of a collision cell 17 having a first integral gas removal ring 31. A similar integral gas removal ring (shown as 32 in FIG. 1) is provided at the ion exit end of the collision cell. Integral gas removal ring 31 is shown in FIG. 8E as being formed as a hollow wall having an outer enclosure portion 124 which is essentially an extension of collision cell gas enclosure 123. The hollow wall has first and second walls 125 and 126 respectively and a transverse axis corresponding to trajectory 12. Enclosure portion 124 and the two walls define a cylindrical distribution cavity 127. Each of walls 125 and 126 has a hole at its center. Ion entry aperture 52 and ion-pass-thru hole 129 of integral gas removal ring 31 constitute the ion entry aperture of the collision cell. Outer enclosure portion 124 includes gas exhaust coupler 130.

Additional detail of how to make and use a mass spectrometer of this general type can be found in U.S. Pat. No. 4,234,791, issued Nov. 18, 1980, to Enke et al.

A first alternative embodiment of a mass spectrometer according to the present invention is shown in FIGS. 8A and 8D. This embodiment includes stand-alone gas removal rings.

Figure 9A:
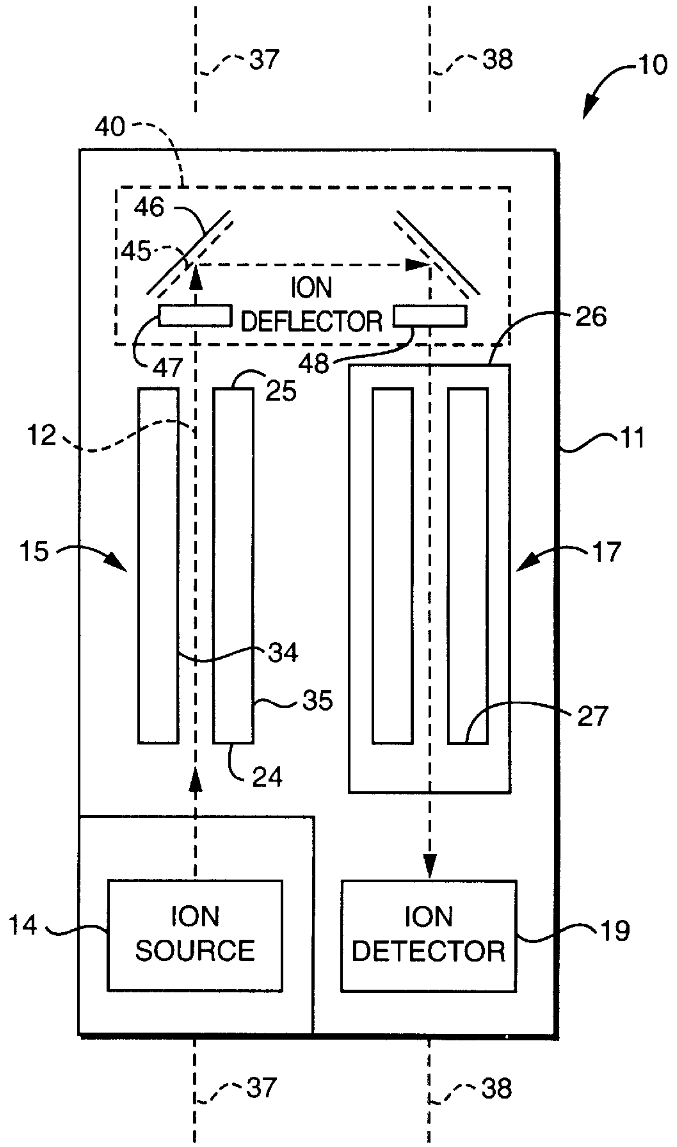
FIGS. 9A and 9B show a first alternative embodiment of a mass spectrometer according to the present invention.
Figure 9B:
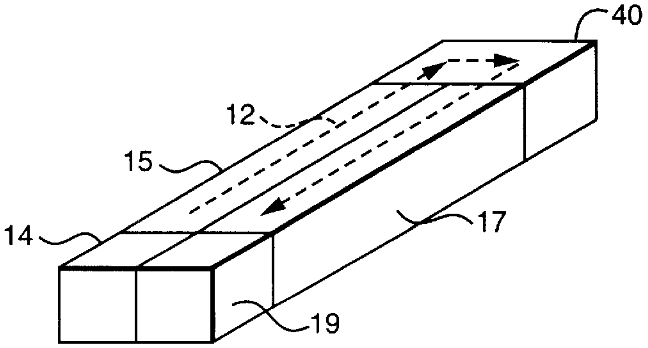

A second first alternative embodiment of a mass spectrometer according to the present invention is shown in FIGS. 9A and 9B. This embodiment includes an ion source, an ion filter, an ion deflector, a collision cell, and an ion detector. In this embodiment, the ion deflector turns the ions through an angle of approximately 180°.

A third alternative embodiment (not shown) replaces the ion filter, ion deflector and collision cell of FIGS. 9A and 9B with a collision cell, fragment deflector and fragment filter, respectively to provide a mass spectrometer having a compact form similar to that of FIGS. 9A and 9B. This embodiment includes an ion source, a collision cell, a fragment deflector, a fragment filter, and an ion detector. In this embodiment, the fragment deflector turns the fragments through an angle of approximately 180°.

Figure 10A:
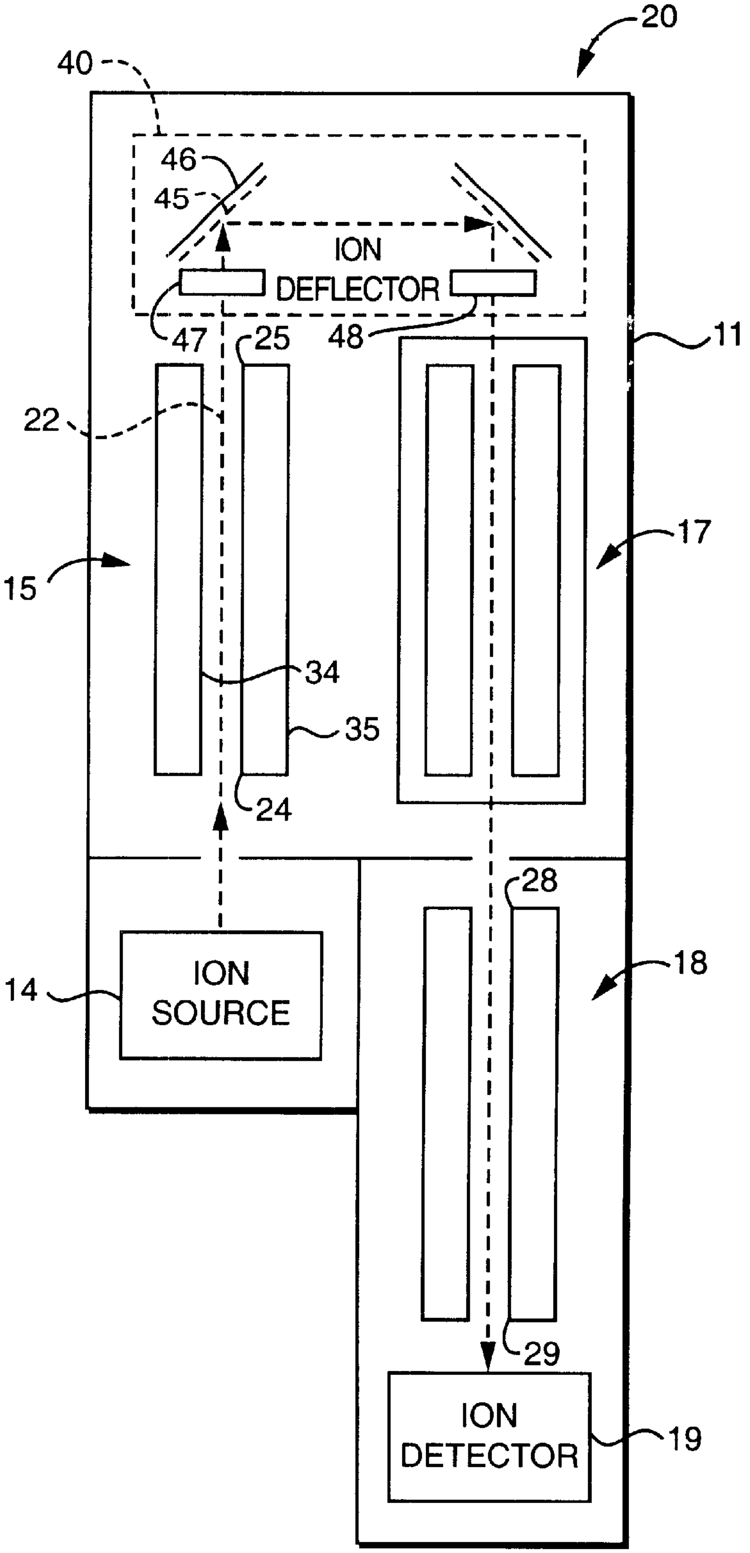
FIGS. 10A and 10B show a second alternative embodiment of a mass spectrometer according to the present invention.
Figure 10B:
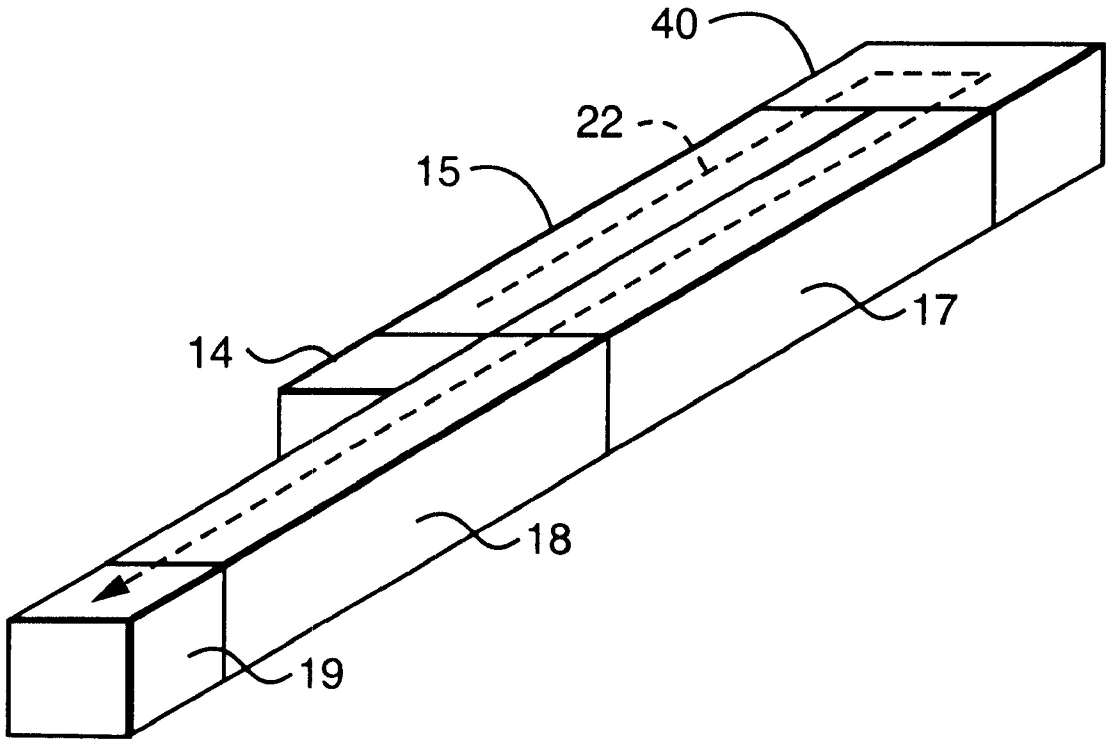
Figure 11A:
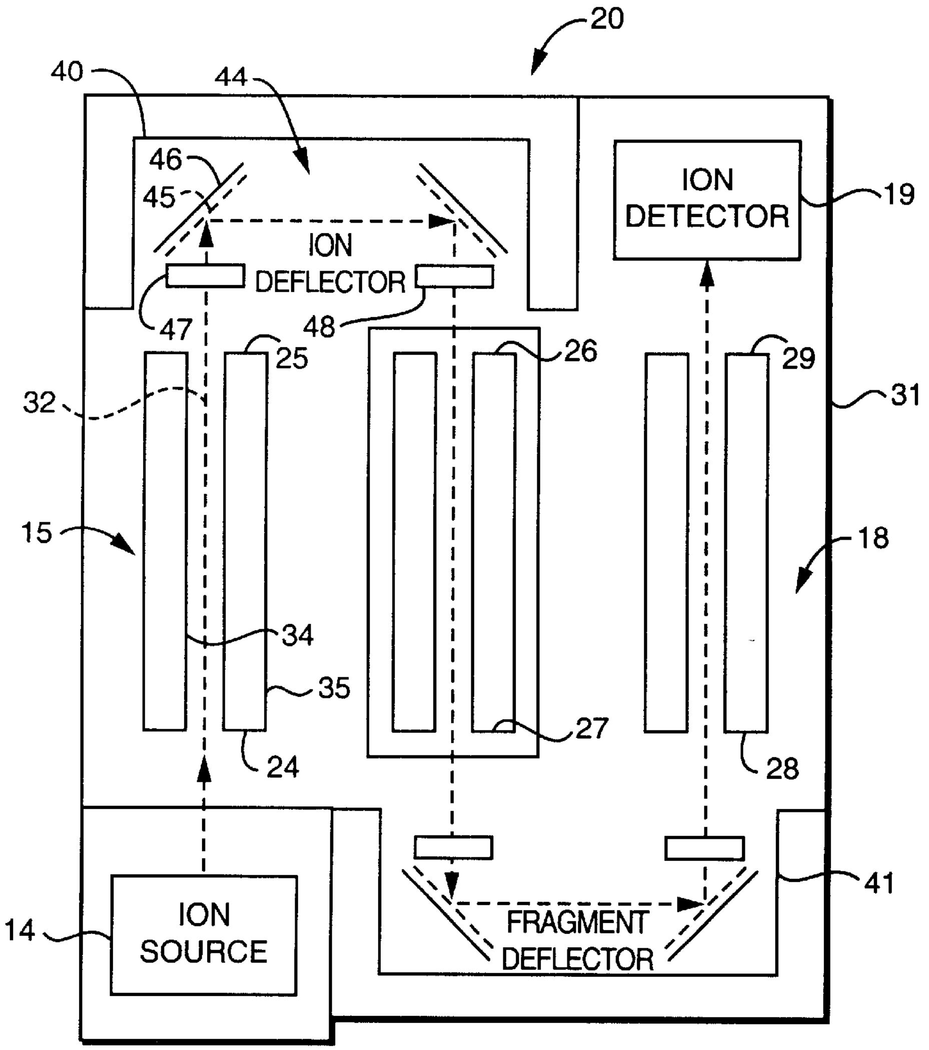
FIGS. 11A and 11B show a third alternative embodiment of a mass spectrometer according to the present invention.
Figure 11B:
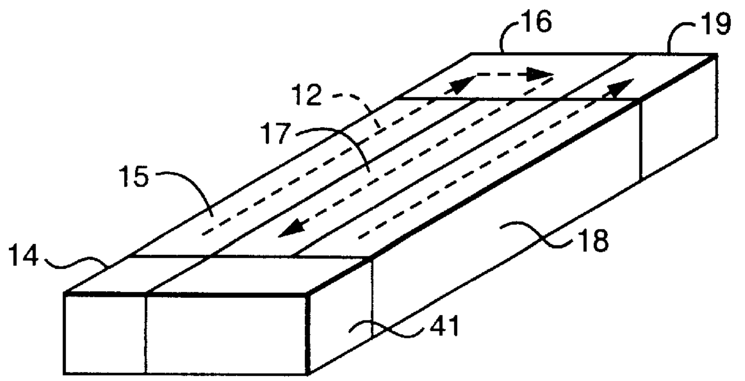
Figure 12A:
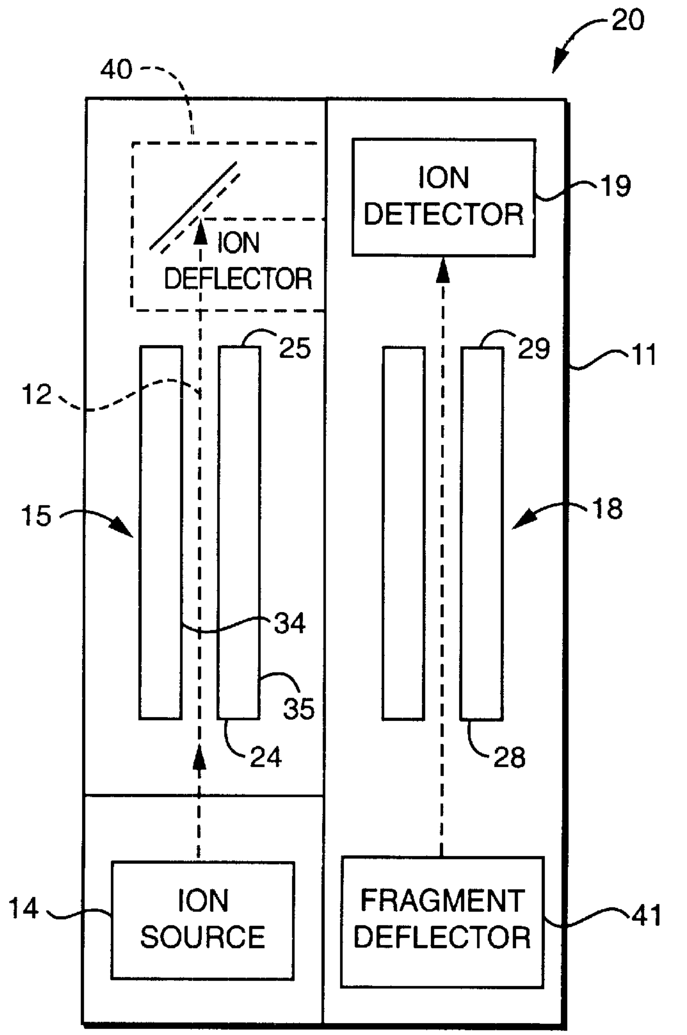
FIGS. 12A and 12B show a fourth alternative embodiment of a mass spectrometer according to the present invention.
Figure 12B:
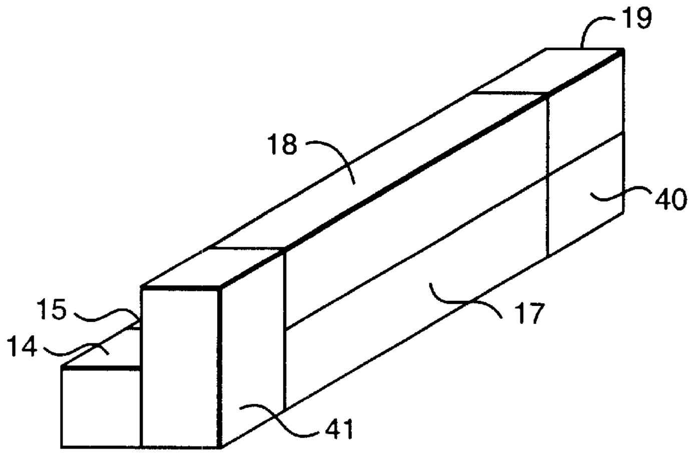

A fourth alternative embodiment of a tandem mass spectrometer according to the present invention is shown in FIGS. 10A and 10B. This embodiment includes an ion source, an ion filter, an ion deflector, a collision cell, a fragment filter, and an ion detector. The ion deflector turns the ions through an angle of approximately 180°.

Fifth and sixth alternative embodiments of a tandem mass spectrometer are shown in FIGS. 11A & 11B and FIGS. 12A & 12B, respectively. These embodiments both include an ion source, an ion filter, an ion deflector, a collision cell, a fragment deflector, a fragment filter, and an ion detector. In each embodiment ion deflector 40 turns the ions through an angle of approximately 180°, and fragment deflector 41 turns the fragments through an angle of approximately 180°.

Figure 13:
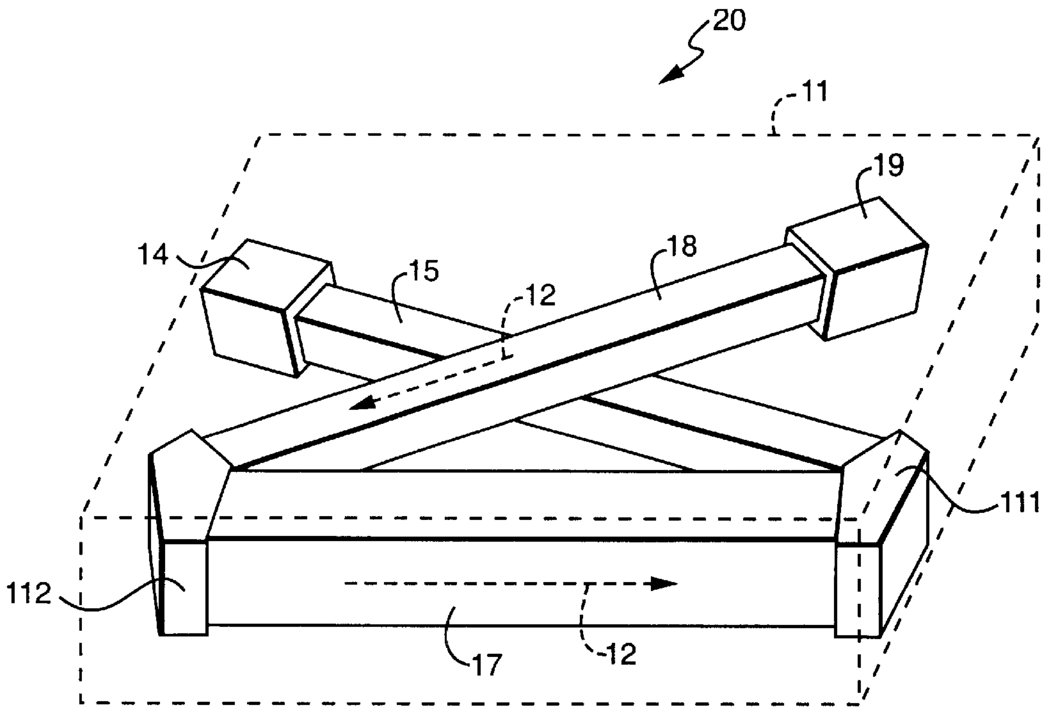
FIG. 13 shows a fifth alternative embodiment of a mass spectrometer according to the present invention.
Figure 14:
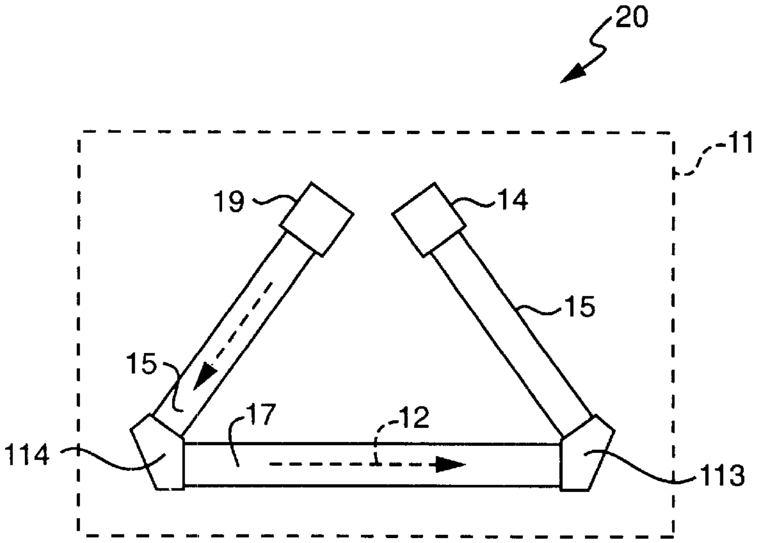
FIG. 14 shows a sixth alternative embodiment of a mass spectrometer according to the present invention.
Figure 15A:
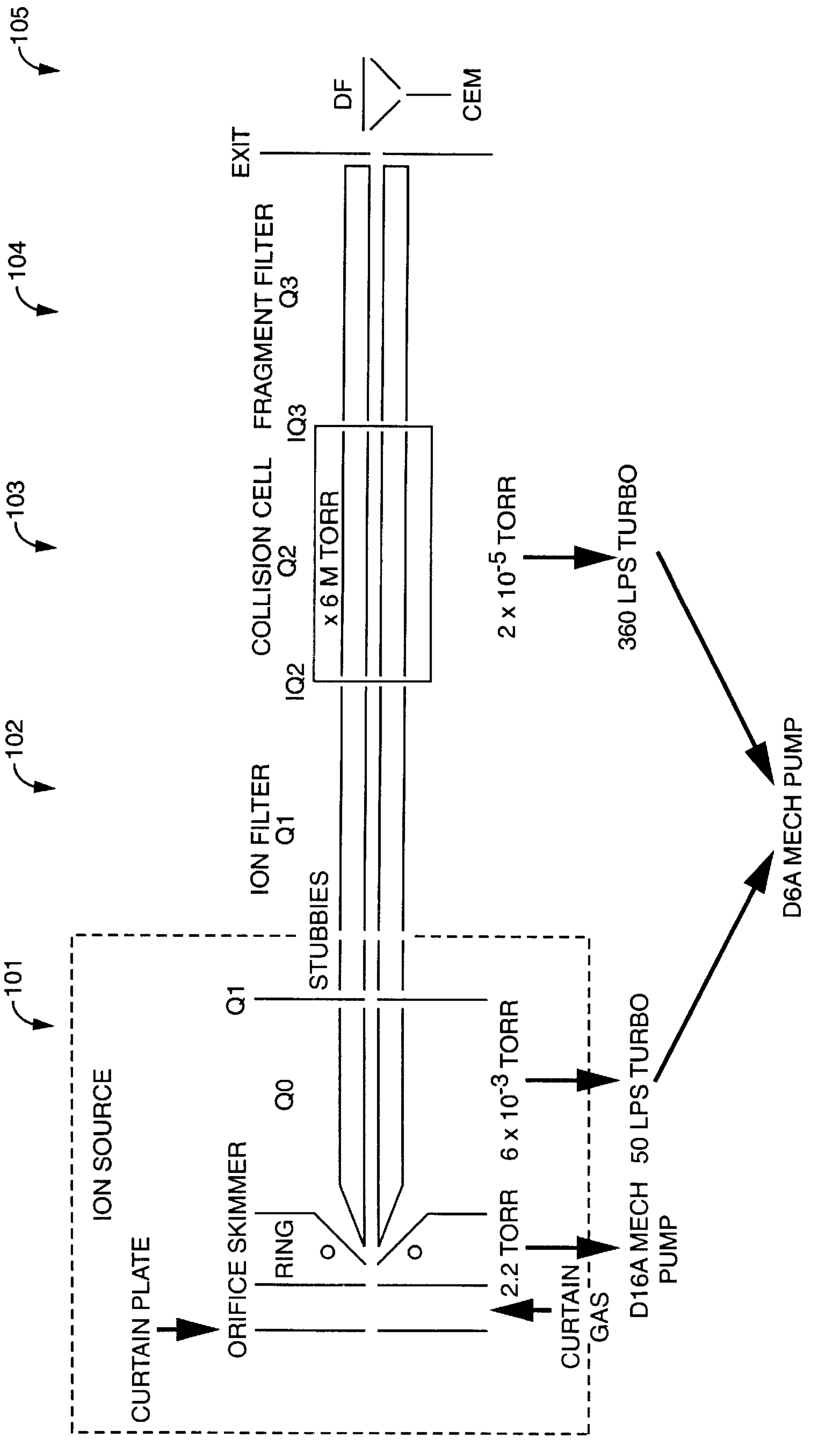
FIGS. 15A and 15B are a schematic view and a cut away elevation view, respectively, of a prior art mass spectrometer having functionality similar to that of the present invention.
Figure 15B:
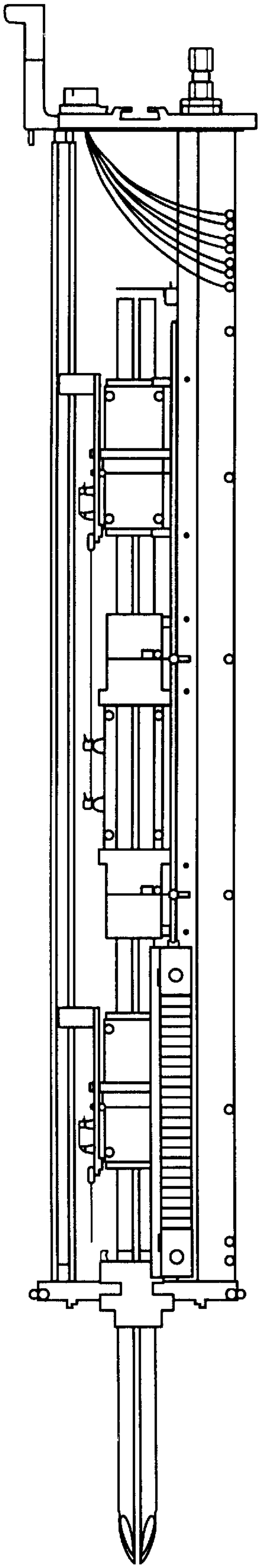

Seventh and eighth alternative embodiments of a tandem mass spectrometer are shown in FIGS. 13 and 14, respectively. In both of these embodiments both the ion deflector (111 and 113, respectively) and the fragment deflector (112 and 114, respectively) deflect through an angle between 90° and 180°.

Figure 16A:
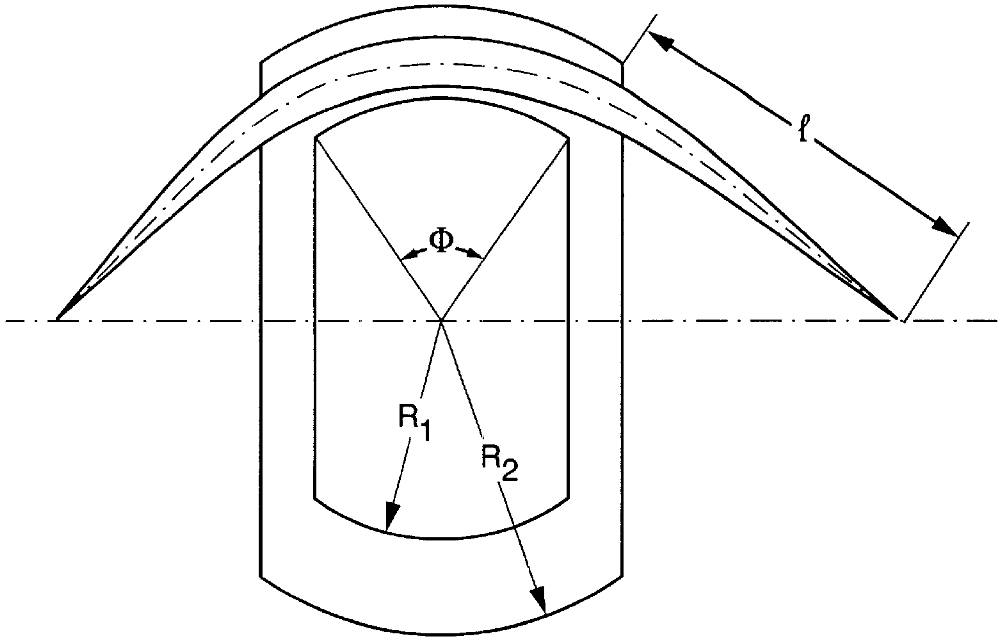
FIG. 16A (PRIOR ART)
FIG. 16A is a schematic view of a spherical analyzer that may be used as an ion deflector in the present invention.
Figure 16B:
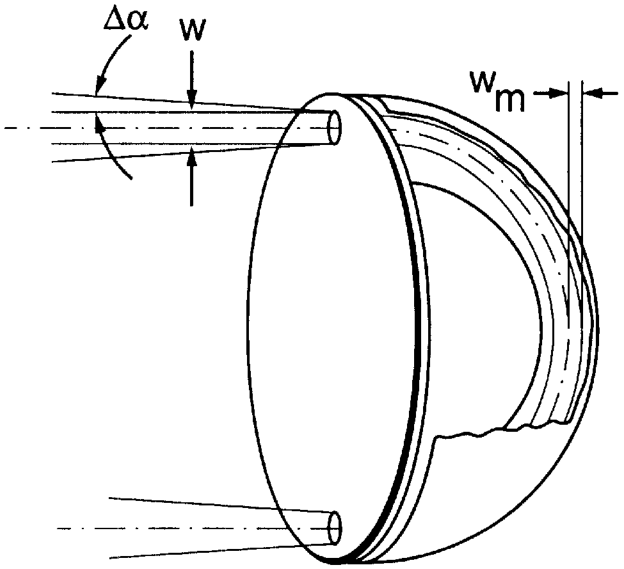
FIG. 16B (PRIOR ART)
FIG. 16B is a cut away, perspective view of a prior art spherical mass analyzer that may be used as an ion deflector in the present invention.

Other embodiments of a tandem mass spectrometer may use an energy analyzer, such as a spherical or radial cylindrical analyzer, as an ion deflector or as a fragment deflector. FIG. 16A is a schematic view of a first spherical analyzer (prior art) that may be used. FIG. 16B is a cut away, perspective view of a second spherical mass analyzer (prior art) that may be used. Details of the operation and construction of energy analyzers is found in "Building Scientific Apparatus—A Practical Guide to Design and Construction" at page 309–312. ("Building Scientific Apparatus", 1983, John H. Moore, Addison-Wesley Publishing Company, Inc., Reading, Mass.).

What is claimed is:

1. A mass spectrometer comprising:

an ion source for producing ions, each ion having a mass to charge ratio;

an ion filter for selectively passing ions according to mass to charge ratio, the ion filter coupled to receive ions from the ion source;

an ion deflector for deflecting ions through a first angle, the ion deflector coupled to receive ions from the ion filter;

a collision cell for fragmenting ions to produce fragments, the collision cell coupled to receive ions from the ion deflector; and an ion detector coupled to receive fragments from the collision cell;

a fragment deflector for deflecting ions through a second angle, the fragment deflector coupled to receive fragments from the collision cell; and a fragment filter for selectively passing fragments according to mass to charge ratio, the fragment filter coupled to receive fragments from the fragment deflector;

wherein the ion detector is coupled to receive fragments from the collision cell via the fragment deflector and the fragment filter;

wherein the collision cell includes a gas enclosure defining an ion entry aperture and a fragment exit aperture;

the mass spectrometer further comprising a gas removal ring for removing gas from a region proximate to an aperture of the gas enclosure.

2. A mass spectrometer according to claim 1, further comprising a first gas removal ring proximate to the ion entry aperture and a second gas removal ring proximate to the fragment exit aperture.

3. A mass spectrometer according to claim 1, further comprising:

an enclosure assembly, the enclosure assembly defining an ion-path chamber and an ion source chamber; and a first vacuum pump, mounted within the enclosure assembly, the first vacuum pump having a high vacuum flange and a low vacuum flange;

wherein the high vacuum flange is coupled to the ion-path chamber; and wherein the low vacuum flange is coupled to the ion-source chamber.

4. A mass spectrometer according to claim 1, further comprising:

an enclosure assembly, the enclosure assembly defining an ion-path chamber and an ion source chamber; and a second vacuum pump, mounted within the enclosure assembly, the second vacuum pump having a high vacuum flange and a low vacuum flange;

wherein the high vacuum flange is coupled to the ion-path chamber; and wherein the low vacuum flange is coupled to the gas removal ring.

5. An apparatus according to claim 1, wherein the mass spectrometer further comprises an ion lens located on an ion trajectory.

6. An apparatus according to claim 1, wherein the ion deflector includes an ion mirror.

7. An apparatus according to claim 1, wherein the ion deflector includes an energy analyzer tuned to effect a change in ion trajectory.

8. An apparatus according to claim 1, wherein the fragment deflector includes an ion lens.

9. An apparatus according to claim 8, wherein the fragment deflector includes an ion mirror.

10. An apparatus according to claim 1, wherein the fragment deflector includes an energy analyzer tuned to effect a change in fragment trajectory.

11. An apparatus according to claim 1, wherein the first angle is approximately 90°.

12. An apparatus according to claim 1, wherein the first angle is approximately 180°.

13. An apparatus according to claim 1, wherein the first angle is between 90° and 180°.

14. An apparatus according to claim 1, wherein the second angle is approximately 90°.

15. An apparatus according to claim 1, wherein the second angle is approximately 180°.

16. An apparatus according to claim 1, wherein the second angle is between 90° and 180°.

17. A mass spectrometer comprising:

an ion source for producing ions, each ion having a mass to charge ratio;

an ion filter for selectively passing ions according to mass to charge ratio, the ion filter coupled to receive ions from the ion source;

a collision cell for fragmenting ions to produce fragments, the collision cell having a gas enclosure, the gas enclosure defining an ion entry aperture coupled to receive ions from the ion filter, the gas enclosure further defining a fragment exit aperture;

a fragment filter for selectively passing fragments according to mass to charge ratio, the fragment filter coupled to receive fragments from the fragment exit aperture;

an ion detector coupled to receive fragments from the fragment filter; and at least one gas removal ring coupled to remove gas from a region proximate to an aperture of the gas enclosure.

18. In a mass spectrometer of the type having an ion source, at least one ion filter, a collision cell and an ion detector, wherein the collision cell includes an enclosure for enclosing a gas, and wherein the enclosure defines an ion entry aperture and an ion exit aperture, an improved collision cell wherein the enclosure defines at least one gas removal ring to remove gas.

19. An improved collision cell according to claim 18, wherein the enclosure defines a first gas removal ring coupled to remove gas from a region proximate to the ion entry aperture, and a second gas removal ring coupled to remove gas from a region proximate to the fragment exit aperture.

20. An improved collision cell according to claim 19, wherein each gas removal ring defines a distribution cavity.

* * * * *